C. D. MOSHER.
TUBE JOINT FOR BOILERS, &c.
APPLICATION FILED DEC. 23, 1911.
1,192,927.
Patented Aug. 1, 1916.
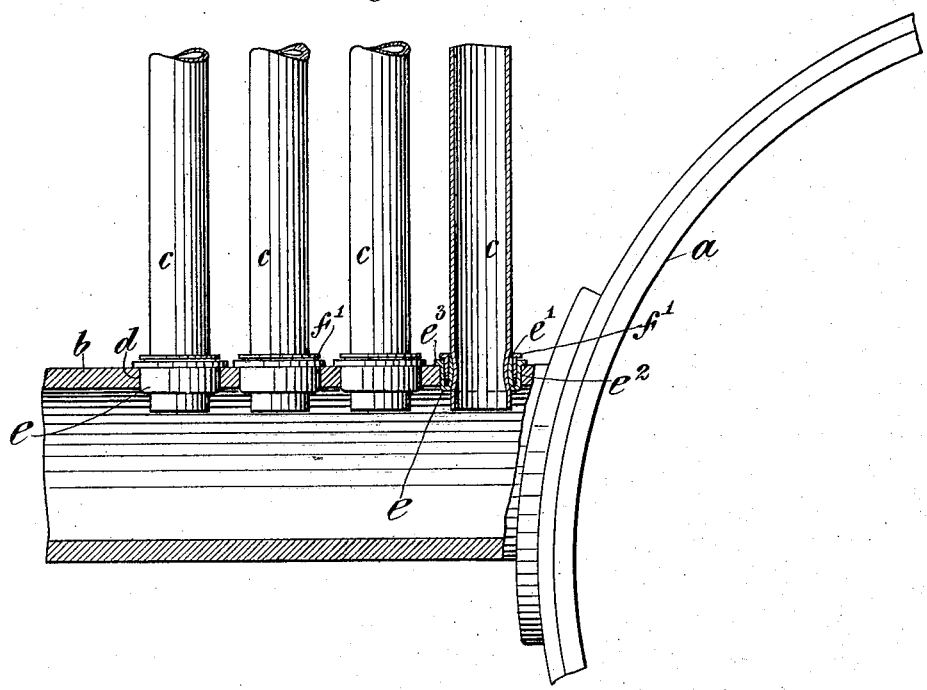
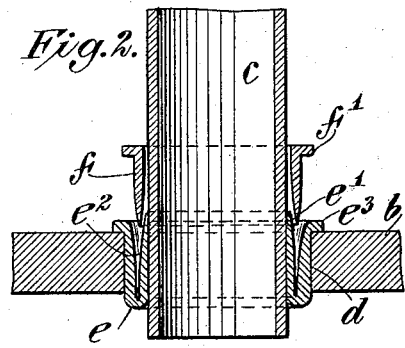
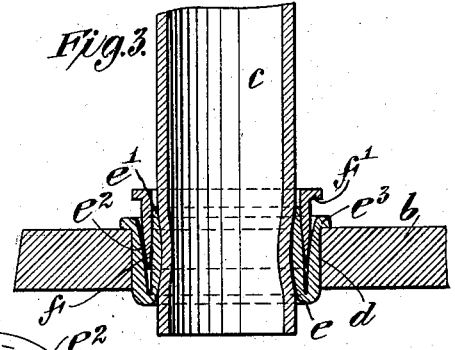
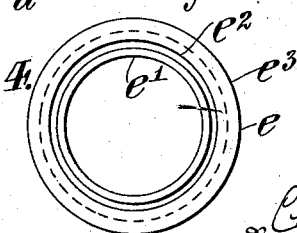
Witnesses:
Inventor
Charles D. Mosher
By his Attorneys

UNITED STATES PATENT OFFICE.

CHARLES D. MOSHER, OF NEW YORK, N. Y., ASSIGNOR, BY MESNE ASSIGNMENTS, TO THE BABCOCK & WILCOX COMPANY, OF BAYONNE, NEW JERSEY, A CORPORATION OF NEW JERSEY.

TUBE-JOINT FOR BOILERS, &c.

1,192,927.

Specification of Letters Patent.

Patented Aug. 1, 1916.

Application filed December 23, 1911. Serial No. 667,483.

*To all whom it may concern:*

Be it known that I, CHARLES D. MOSHER, residing in the borough of Manhattan of the city of New York, State of New York, have invented certain new and useful Improvements in Tube-Joints for Boilers, &c., of which the following is a specification, reference being had to the accompanying drawing, which forms a part hereof.

In the construction of boilers, condensers, etc., in which relatively small tubes are to be secured to a flue-sheet, tube sheet, header or other like part, the joint between each tube and the tube sheet or other part is usually made by expanding the end of the tube in a hole in the tube sheet, but in some cases it is impossible or difficult to get at the end of the tube for the purpose of applying the expanding tool.

It is the object of this invention to enable a satisfactory joint to be made between a tube and a tube sheet or other part without requiring access to be had to the inner end of the tube. In accordance with the invention an annular or double walled thimble is interposed between the tube and the wall of the hole through the tube sheet or other part and is expanded by suitable means such as a sectional or annular wedge driven into the thimble from the outside of the tube. The wall of the hole in the tube sheet is practically unyielding and the tube itself is therefore compressed by compressing the inner wall of the thimble and is indented circumferentially to a degree sufficient to insure not only a tight joint but the retention of the tube in place until the wedge is withdrawn.

The invention will be more fully explained hereinafter with reference to the accompanying drawing in which it is illustrated and in which—

Figure 1 is a view illustrating the application of the improved joint. Figs. 2 and 3 are detail views illustrating the application of the double walled thimble and the wedging device. Fig. 4 is a top view of the thimble.

In the application of the invention illustrated in Fig. 1 a drum $a$ is represented as having a header $b$ to which tubes $c$ are secured. It will be seen, however, that the invention can be applied to a great variety of structures and that the header $b$, in the construction shown, is merely representative of any part to which the tubes are to be secured, such parts being designated generally as tube sheets. Each hole $d$ in the tube sheet has a diameter greater than the external diameter of the tube $c$ to be secured therein, so that there can be inserted between the tube and the wall of the hole an annular or double walled thimble $e$, which is preferably formed as shown with an inner part $e'$ and an outer part $e^2$ which has a lip $e^3$ to overlap the periphery of the hole through the tube sheet and thereby prevent the thimble from being driven through the hole. As means for compressing the inner wall of the thimble, after it is in place between the tube and the tube sheet, there is provided a wedge $f$ which may be either annular or sectional and is preferably provided with a lip $f'$ so that the wedge can be withdrawn if necessary. In forming the joint the thimble $e$, encircling the tube, is pushed into the hole in the tube sheet and the wedge $f$ is then inserted, as shown in Fig. 2, and is driven part way into the same, as shown in Fig. 3. The wall of the hole in the tube sheet is practically unyielding so that the effect of driving the wedge $f$, as shown in Fig. 3, is to make a tight joint between the outer part of the thimble and the tube sheet and to force the inner part $e'$ of the thimble inwardly, compressing the tube somewhat, as also shown in said figure, thus not only making a tight joint between the thimble and the tube, but insuring the retention of the tube in the tube sheet. Whenever it is desired to withdraw the tube from the tube sheet, the wedge $f$ is withdrawn by a suitable tool, the pressure being thereby relieved so that it is possible to withdraw the tube and thimble together from the tube sheet. In the initial application of this device it is not intended to drive the wedge clear home as in case the joint should prove to be leaky at first or the tube should work loose from any cause, the wedge may be driven farther into the thimble and thereby make the joint tight and more securely hold the tube in the tube sheet.

I claim as my invention:—

1. The combination with a tube sheet having a circular hole, of a tube having its end seated within the hole, a U-shaped thimble within the hole and of sufficiently rigid material to cause distortion of the tube, and a sleeve clamping wedge system adapted to be driven between the walls of the thimble and distort inwardly the inner wall of the thimble and the tube wall; substantially as described.

2. The combination with a tube sheet having a circular hole, of a tube having its end seated within the hole, a U-shaped thimble within the hole and of sufficiently rigid material to cause distortion of the tube, and a sleeve clamping wedge system adapted to be driven between the walls of the thimble and distort inwardly the inner wall of the thimble and the tube wall, the wedge engaging portion of the inner wall being curved; substantially as described.

3. The method of securing tube ends within tube sheets, consisting in assembling within the tube sheet hole a tube having a U-shaped thimble surrounding it within said hole, the thimble being of sufficiently rigid material to cause distortion of the tube end, and driving a sleeve locking wedge into the thimble and distorting its inner wall and the adjacent tube walls inwardly against the resistance of the walls of the tube sheet hole; substantially as described.

This specification signed and witnessed this 15th day of December, A. D. 1911.

CHARLES D. MOSHER.

Signed in the presence of—
W. B. GREELY,
WORTHINGTON CAMPBELL.

Copies of this patent may be obtained for five cents each, by addressing the "Commissioner of Patents, Washington, D. C."